United States Patent
Yamada (10) Patent No.: US 11,734,077 B2
(45) Date of Patent: Aug. 22, 2023

(54) EVALUATION DEVICE, EVALUATION METHOD AND EVALUATION PROGRAM

(71) Applicant: Nippon Telegraph and Telephone Corporation, Tokyo (JP)

(72) Inventor: Takeshi Yamada, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 304 days.

(21) Appl. No.: 17/292,587

(22) PCT Filed: Oct. 30, 2019

(86) PCT No.: PCT/JP2019/042444
§ 371 (c)(1),
(2) Date: May 10, 2021

(87) PCT Pub. No.: WO2020/100581
PCT Pub. Date: May 22, 2020

(65) Prior Publication Data
US 2021/0397483 A1  Dec. 23, 2021

(30) Foreign Application Priority Data
Nov. 13, 2018 (JP) ................. 2018-213176

(51) Int. Cl.
*G06F 9/46* (2006.01)
*G06F 9/50* (2006.01)
*G06F 9/48* (2006.01)
*G06F 11/34* (2006.01)

(52) U.S. Cl.
CPC .......... *G06F 9/5038* (2013.01); *G06F 9/4887* (2013.01); *G06F 11/3423* (2013.01)

(58) Field of Classification Search
CPC ... G06F 9/5038; G06F 9/4887; G06F 11/3423
See application file for complete search history.

(56) References Cited

FOREIGN PATENT DOCUMENTS

JP         2018-25860         2/2018

*Primary Examiner* — Gregory A Kessler
(74) *Attorney, Agent, or Firm* — Fish & Richardson P.C.

(57) ABSTRACT

A performance influence involved in system transition is evaluated in consideration of a timer set for each processing section. An evaluation device 1 includes a storage device 10 that stores processing section data 11 in which a maximum time from start to expiration of a timer is associated with an identifier of a processing section in which the timer is set, an average waiting time calculating unit 21 that calculates an average waiting time of a service request based on a turn-around time necessary for processing in the accumulation device 4 for each processing section, and as evaluation unit 22 that evaluates that data used in the processing section is not separable to the accumulation device 4 when the maximum time of the timer set in the processing section is less than the sum of the average waiting time and a traffic amount per unit time.

9 Claims, 8 Drawing Sheets

| IDENTIFIER OF PROCESSING SECTION | MAXIMUM TIME OF TIMER | PROCESSING TYPE |
|---|---|---|
| ... | ... | ... |
| ... | ... | ... |
| ... | ... | ... |

11 PROCESSING SECTION DATA

Fig. 5

| IDENTIFIER OF PROCESSING SECTION | AVERAGE WAITING TIME | EVALUATION VALUE |
|---|---|---|
| ... | ... | ... |
| ... | ... | ... |
| ... | ... | ... |

21 EVALUATION DATA

$\rho$ USAGE RATIO: $\rho = \dfrac{\lambda}{\mu}$

$\lambda$ (NUMBER OF SERVICE REQUESTS): CALL AMOUNT PER UNIT TIME $\mu$ (SERVICE RATIO): $\mu = \dfrac{1}{TAT}$ Tw (AVERAGE WAITING TIME): $\dfrac{\rho^2}{1-\rho}$ TAT

$\rho$ USAGE RATIO: $\rho = \dfrac{\lambda}{n\mu}$ $\lambda$ (NUMBER OF SERVICE REQUESTS): CALL AMOUNT PER UNIT TIME

$\mu$ (SERVICE RATIO): $\mu = \dfrac{1}{TAT}$ n(NUMBER OF SERVICE WINDOWS): PROCESSING ROUTE TO DB Tw(AVERAGE WAITING TIME): $\dfrac{\rho(n\rho)^2}{n!(1-\rho)^2 \lambda} P_0$ $P_0$(PROBABILITY THAT THERE IS NO PERSON IN SYSTEM): $P_0 = \begin{cases} 1 - n\rho & (n\rho \ll 1) \\ \dfrac{(1-\rho)n!}{n^2} & (\rho \to 1) \end{cases}$

Fig. 8

EVALUATION DEVICE, EVALUATION METHOD AND EVALUATION PROGRAM

CROSS-REFERENCE TO RELATED APPLICATIONS

This application is a National Stage application under 35 U.S.C. § 371 of International Application No. PCT/JP2019/042444, having an International Filing Date of Oct. 30, 2019, which claims priority to Japanese Application Serial No. 2018-213176, filed on Nov. 13, 2018. The disclosure of the prior application is considered part of the disclosure of this application, and is incorporated in its entirety into this application.

TECHNICAL FIELD

The present invention relates to an evaluation device, an evaluation method, and an evaluation program for evaluating whether to separate data used for an application to a device executing an application and an accumulation device connected via a communication network when the application is designed.

BACKGROUND ART

There is a data separation evaluating device that evaluates whether to separate data used for an application to a device executing an application and an accumulation device connected via a communication network when the application is designed (see PTL 1). In PTL 1, a score is calculated to evaluate whether to separate data from the viewpoint of attributes in use cases with regard to each use case in which data is used for an application and each attribute in which data is used, and whether to separate the data is determined.

PTL 1 proposes that data is kept inside since there is a possibility of a problem occurring in real time processing due to a delay influence, for example, in access to data in each signal processing of call processing. On the other hand, keeping data outside has been proposed when access to data is just one time, for example, upon acquirement of subscriber information.

In transition to a data separation system, access processing to the accumulation device connected via the communication network is newly added in each application. Such access leads to extension of a turnaround time (TAT), which has an influence on a system performance in some cases. Accordingly, before development determination, it is necessary to evaluate an influence involved in the transition to a system such as a data separation system or the like.

CITATION LIST

Patent Literature

[PTL 1] Japanese Unexamined Patent Publication No. 2018-25860

SUMMARY OF THE INVENTION

Technical Problem

However, existing systems become complicated due to accumulation of longtime development. From documents of specifications of such systems, it is very difficult to predict influence evaluation involved in system transition and it is difficult to obtain appropriate determination materials for development determination.

In particular, it is necessary to complete processing before a timer is set for each predetermined processing section and the timer expires.

Accordingly, an objective of the present invention is to provide an evaluation device, an evaluation method, and an evaluation program capable of evaluating a performance influence involved in system transition in consideration of a timer set for each processing section.

Means for Solving the Problem

To solve the foregoing problems, according to a first aspect of the present invention, an evaluation device evaluates whether to separate data used for an application to a device performing the application and an accumulation device connected via a communication network when the application is designed. According to the first aspect of the present invention, the processing device includes: a storage device configured to store processing section data in which a maximum time from start to expiration of a timer is associated with an identifier of a processing section in which the timer is set; an average waiting time calculating unit configured to calculate an average waiting time of a service request based on a turnaround time necessary for processing in the accumulation device for each processing section; and an evaluation unit configured to evaluate that data used in the processing section is not separable to the accumulation device when the maximum time of the timer set in the processing section is less than the sum of the average waiting time and a traffic amount per unit time.

The evaluation unit may calculate an evaluation value which increases as the average waiting time calculated for each processing section increases and increases as the maximum time of the timer set in the processing section decreases, and may output a processing section in which the evaluation value is high as an improvement target processing section.

In the processing section data, a processing type indicating whether the processing is single processing connected to the accumulation device by one thread or multi-processing connected to the accumulation device by a plurality of threads may be further associated with the identifier of the processing section. The average waiting time calculating unit may calculate the average waiting time of the service request based on the processing type.

According to a second aspect of the present invention, there is provided an evaluation method of evaluating whether to separate data used for an application to a device performing the application and an accumulation device connected to a communication network when the application is designed. According to the second aspect of the present invention, the evaluation method includes: causing a computer to store processing section data in which a maximum time from start to expiration of a timer is associated with an identifier of a processing section in which the timer is set; causing the computer to calculate an average waiting time of a service request based on a turnaround time necessary for processing in the accumulation device for each processing section; and causing the computer to evaluate that data used in the processing section is not separable to the accumulation device when the maximum time of the timer set in the processing section is less than the sum of the average waiting time and a traffic amount per unit time.

In the evaluating of the data, an evaluation value which increases as the average waiting time calculated for each processing section increases and increases as the maximum time of the timer set in the processing section decreases may be calculated, and a processing section in which the evaluation value is high may be output as an improvement target processing section.

In the processing section data, a processing type indicating whether the processing is single processing connected to the accumulation device by one thread or multi-processing connected to the accumulation device by a plurality of threads may be further associated with the identifier of the processing section. In the calculating of the average waiting time, the average waiting time of the service request may be calculated based on the processing type.

According to a third aspect of the present invention, an evaluation program causes the computer to function as the evaluation device according to the first aspect of the present invention.

Effects of the Invention

According to the present invention, it is possible to provide the evaluation device, the evaluation method, and the evaluation program capable of evaluating a performance influence involved in system transition in consideration of a timer set for each processing section.

DESCRIPTION OF EMBODIMENTS

Next, embodiments of the present invention will be described with reference to the drawings. Hereinafter, the same or similar reference numerals are given to the same or similar units in description of the following drawings.

(Evaluation Device)

Figure 1:
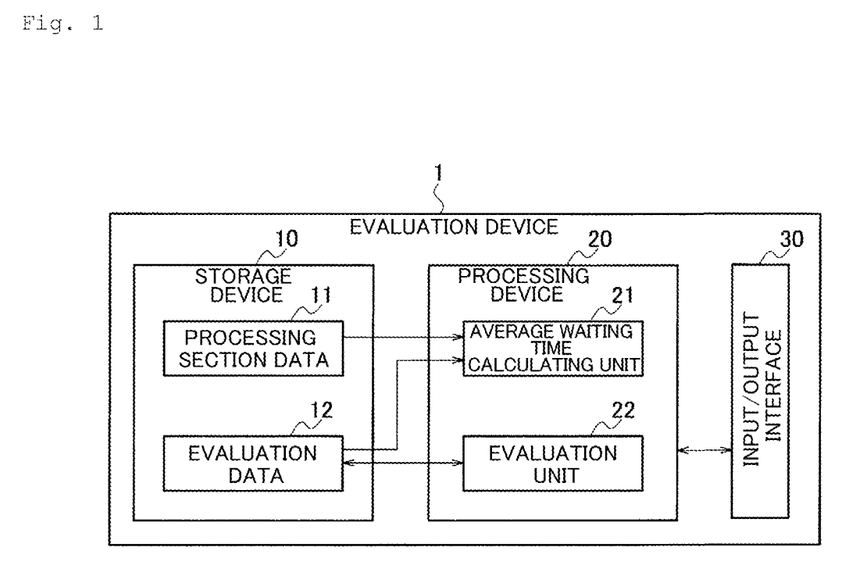
FIG. 1 is a diagram illustrating a hardware configuration and a functional block of an evaluation device according to an embodiment of the present invention.

As illustrated in FIG. 1, an evaluation device 1 according to an embodiment of the present invention evaluates whether to separate data used for an application to a device performing the application and an accumulation device connected via a communication network when the application is designed. An existing call processing server keeps data used for processing in the call processing server. However, with system modification, it may be determined whether the data is separated to a call processing server 3 and an accumulation device 4 connected via a communication network or the data is kept in the call processing server 3. The evaluation device 1 illustrated in FIG. 1 evaluates an influence when the call processing server 3 separates data referred to or output to the accumulation device 4 as in a communication system illustrated in FIG. 2. Specifically, the evaluation device 1 evaluates the separation to the accumulation device 4 based on whether processing can be completed within a preset timer value in the call processing server 3.

The call processing server 3 controls communication with a communication terminal 7. For example, in a communication system 8 illustrated in FIG. 2, a communication terminal 7 attempts a call with a communication terminal 7 of a transmission destination. When the communication terminal 7 designates and sends a telephone number of the communication terminal 7 of the transmission destination, an INVITE message is transmitted and a gateway server of the call processing system 6 receives the INVITE message and transmits the INVITE message to the call processing server 3. Thereafter, the call processing server 3 transmits 100 Trying messages to the communication terminal 7 of the transmission source and transmits the INVITE message to the communication terminal 7 of the transmission destination.

At this time, the call processing server 3 activates a timer when the INVITE message is received, and is controlled such that 100 Trying messages are transmitted within a predetermined time. When the timer expires without transmitting 100 Trying messages within the predetermined time, the call processing server 3 retransmits the signal or drops a call. The load of the call processing server 3 increases due to the retransmission or the call loss and the load further increases in a snowballing manner. Finally, there is a possibility of system down or system reboot occurring. Accordingly, even when data is separated to the accumulation device 4 with system modification, processing is requested to be completed within a timer value set in the existing system.

The call processing server 3 appropriately sets such a timer. The call processing server 3 activates another different timer when the INVITE message is received and transmits the INVITE message to the communication terminal 7 of the transmission destination within a predetermined time. As in processing sections (1) and (2) illustrated in FIG. 3, a plurality of timers may operate in duplicate in some cases in predetermined sections.

The call processing server 3 refers to or updates data stored in a storage device of the call processing server 3 or data stored in the accumulation device 4. More time is needed for access to the data of the accumulation device 4 than access to the data of the call processing server 3. When the number of accesses to the accumulation device 4 increases, a processing time increases and processing cannot be completed within a set timer value in some cases.

Accordingly, the evaluation device 1 according to the embodiment of the present invention defines a section from start to end of a timer as a processing section and evaluates an influence when data used by the call processing server 3 is separated to the accumulation device 4 for each processing section.

As illustrated in FIG. 1, the evaluation device 1 is a general computer that includes a storage device 10, a processing device 20, and an input/output interface 30. The general computer realizes functions illustrated in FIG. 1 by executing an evaluation program.

The storage device 10 is a read only memory (ROM), a random access memory (RAM), a hard disk, or the like and stores various kinds of data such as input data, output data, and intermediate data used for the processing device 20 to perform processing. The processing device 20 is a central processing unit (CPU) and performs processing in the evaluation device 1 by reading and writing data stored in the storage device 10 or inputting or outputting data to and from the input/output interface 30. The input/output interface 30 is an interface for connecting the evaluation device 1 to an input device or an output device.

The storage device 10 stores the evaluation program and stores processing section data 11 and evaluation data 12.

Figure 4:
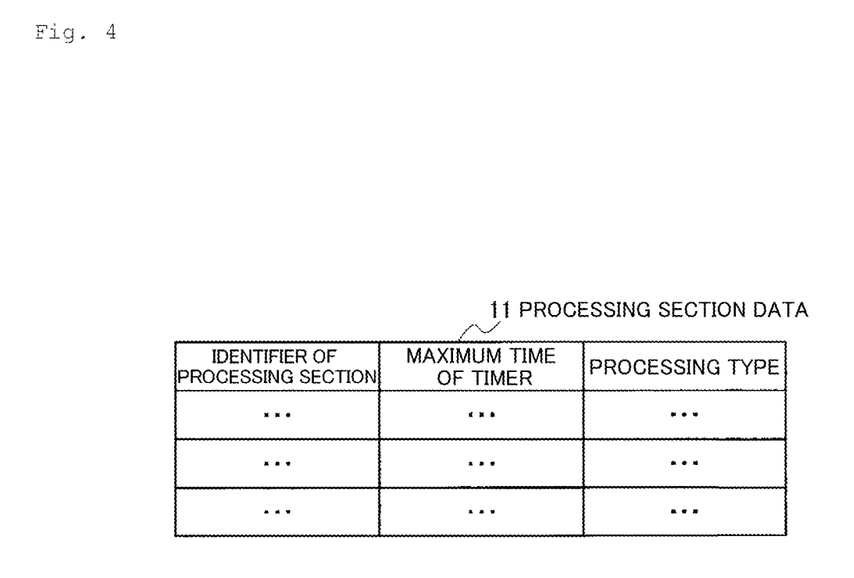
FIG. 4 is a diagram illustrating a data example of a data structure of processing section data stored by the evaluation device according to the embodiment of the present invention.

The processing section data 11 is data in which a maximum time from start to expiration of a timer is associated with an identifier of a processing section in which the timer is set. As illustrated in FIG. 4, the processing section data 11 is data in which a maximum time and a processing type used in the processing section are associated with the identifier of the processing section. In the embodiment of the present invention, the processing section data 11 is stored in advance in the storage device 10.

Figure 3:
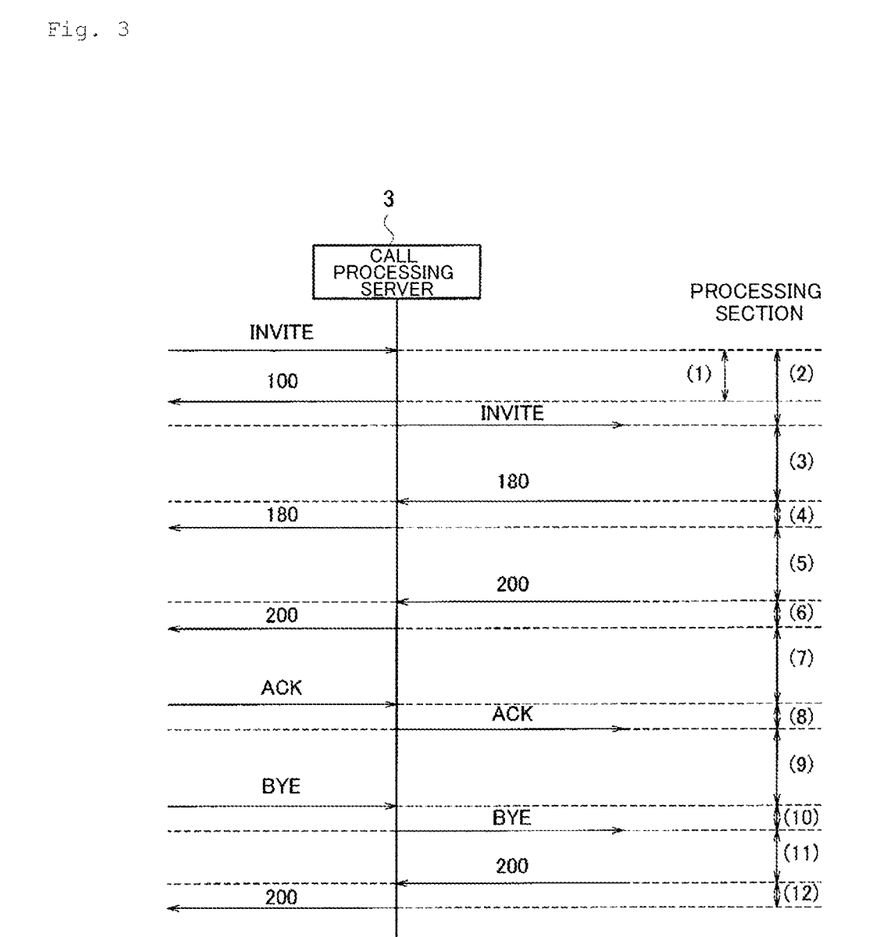
FIG. 3 is a diagram illustrating an example of data processed by the call processing server which is an evaluation target of the evaluation device according to the embodiment of the present invention.

As described with reference to FIG. 3, the identifier of the processing section identifies a processing section from start to end of a timer. The start of the timer is determined in accordance with a predetermined trigger and the end of the timer is determined in accordance with a predetermined trigger or passing of the maximum time set in the timer. As shown in the processing sections (1) and (2) of FIG. 3, a plurality of processing sections may be duplicately set.

The maximum time of the timer is a time necessary from start of the timer to expiration and end of the timer. The processing type indicates whether processing is single processing connected to the accumulation device 4 by one thread or multi-processing connected to the accumulation device 4 by a plurality of threads.

Figure 5:
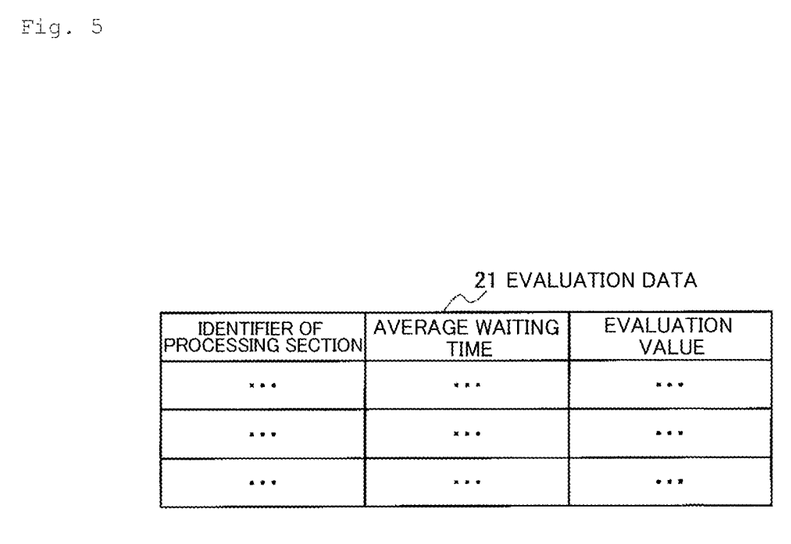
FIG. 5 is a diagram illustrating a data example of a data structure of evaluation data stored by the evaluation device according to the embodiment of the present invention.

As illustrated in FIG. 5, the evaluation data 12 is data in which an average waiting time and an evaluation value are associated with the identifier of the processing section. The average waiting time and the evaluation value are set by an average waiting time calculating unit 21 and an evaluation unit 22 to be described below.

The processing device 20 includes the average waiting time calculating unit 21 and the evaluation unit 22.

Figure 2:
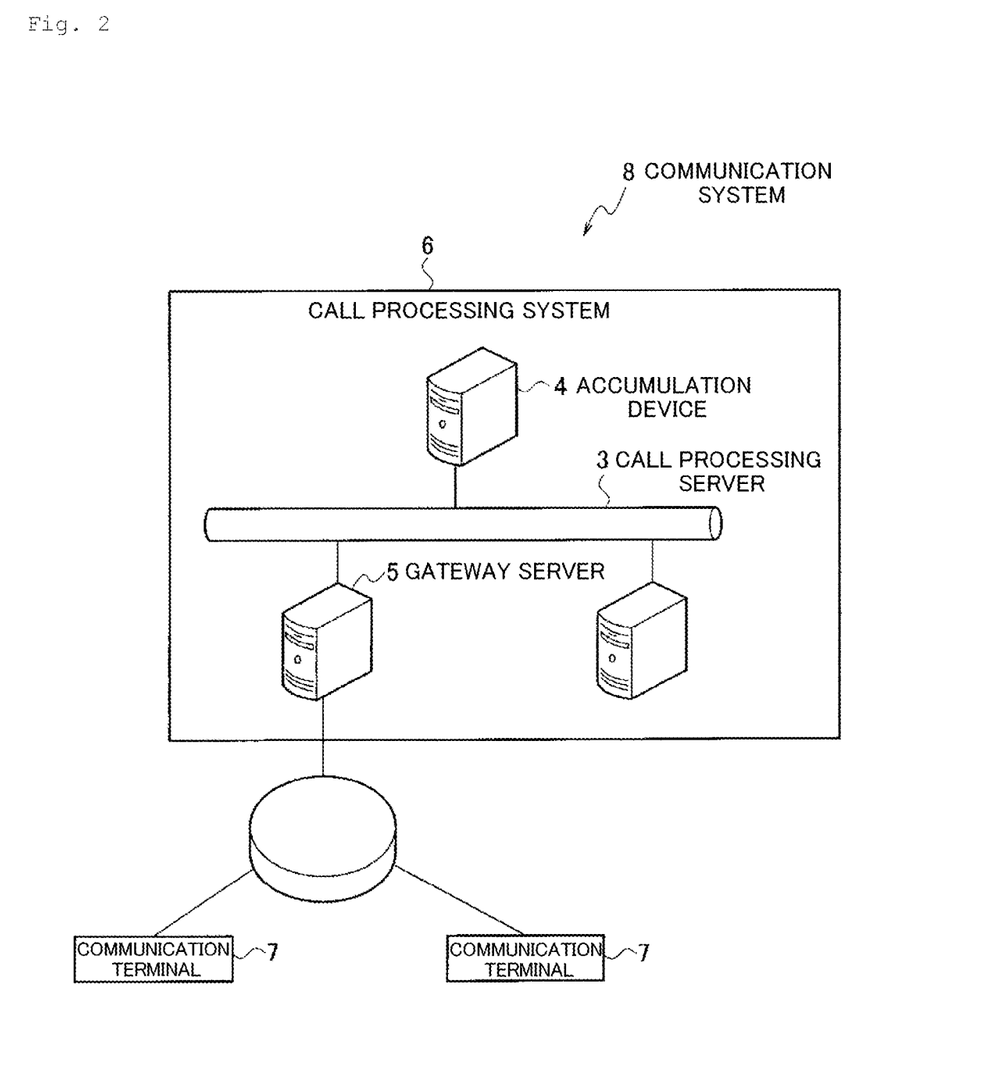
FIG. 2 is a diagram illustrating an example of a communication system that includes a call processing server as an evaluation target of the evaluation device according to the embodiment of the present invention.

The average waiting time calculating unit 21 calculates an average waiting rime of a service request based on a turnaround time necessary for processing in the accumulation device 4 for each processing section. The average waiting time is an average time necessary for the call processing server 3 to receive a request and return a response to the request. The average waiting time is calculated based on a traffic amount of an existing system and a turnaround time at the time of separation of data to the accumulation device 4 in consideration of the call processing server 3, the accumulation device 4, delay between the call processing server 3 and the accumulation device 4, and the like. The turnaround time is calculated in advance under a test environment in which the communication system 8 illustrated in FIG. 2 is assumed. The average waiting time calculating unit 21 calculates the average waiting time of the service request based on the processing type further set in the processing section data 11.

Figure 6:
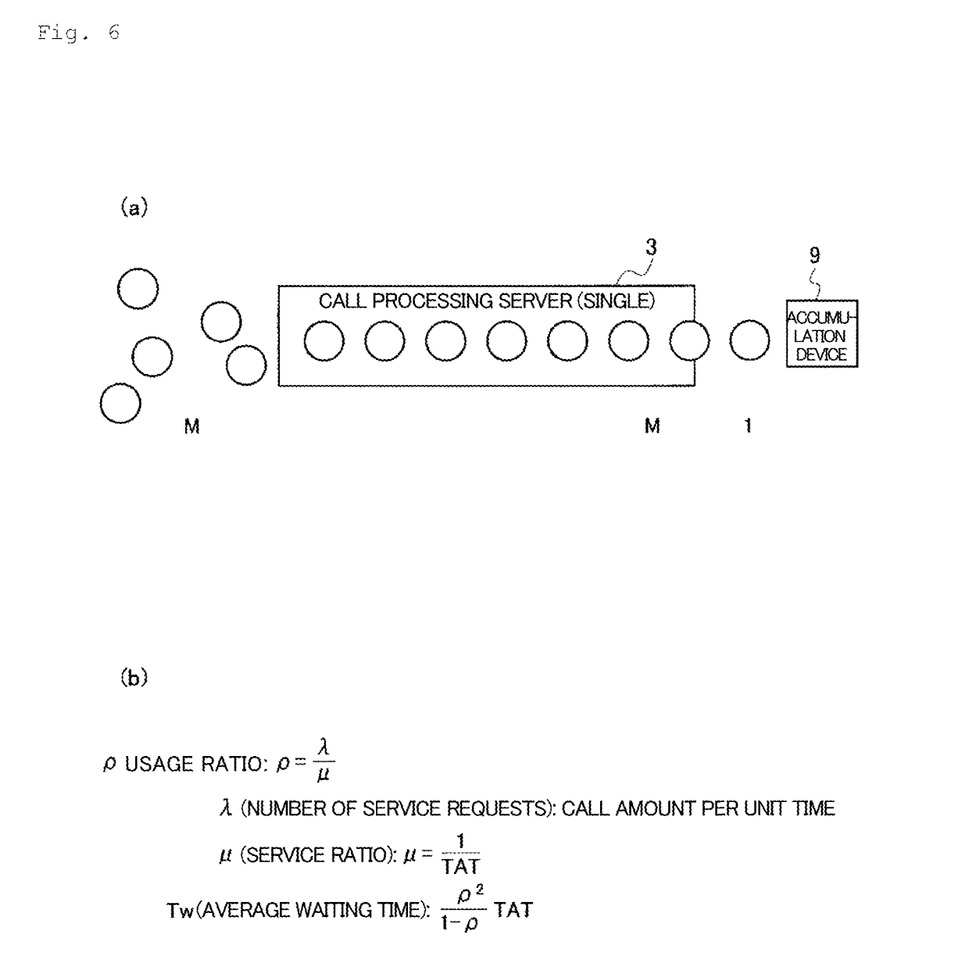
FIG. 6 is a diagram illustrating processing of calculating an average waiting time when the number of windows is one.

Processing of calculating the average waiting time when the processing type is single will be described with reference to FIG. 6. As illustrated in FIG. 6(a), when the processing type is single, access to the accumulation device 4 is made by one thread in the call processing server 3. An average waiting time Tw is calculated using a usage ratio ρ and a turnaround time TAT in this case, as illustrated in FIG. 6(b). A call amount per unit time is a traffic amount of a system which is currently operating.

Figure 7:
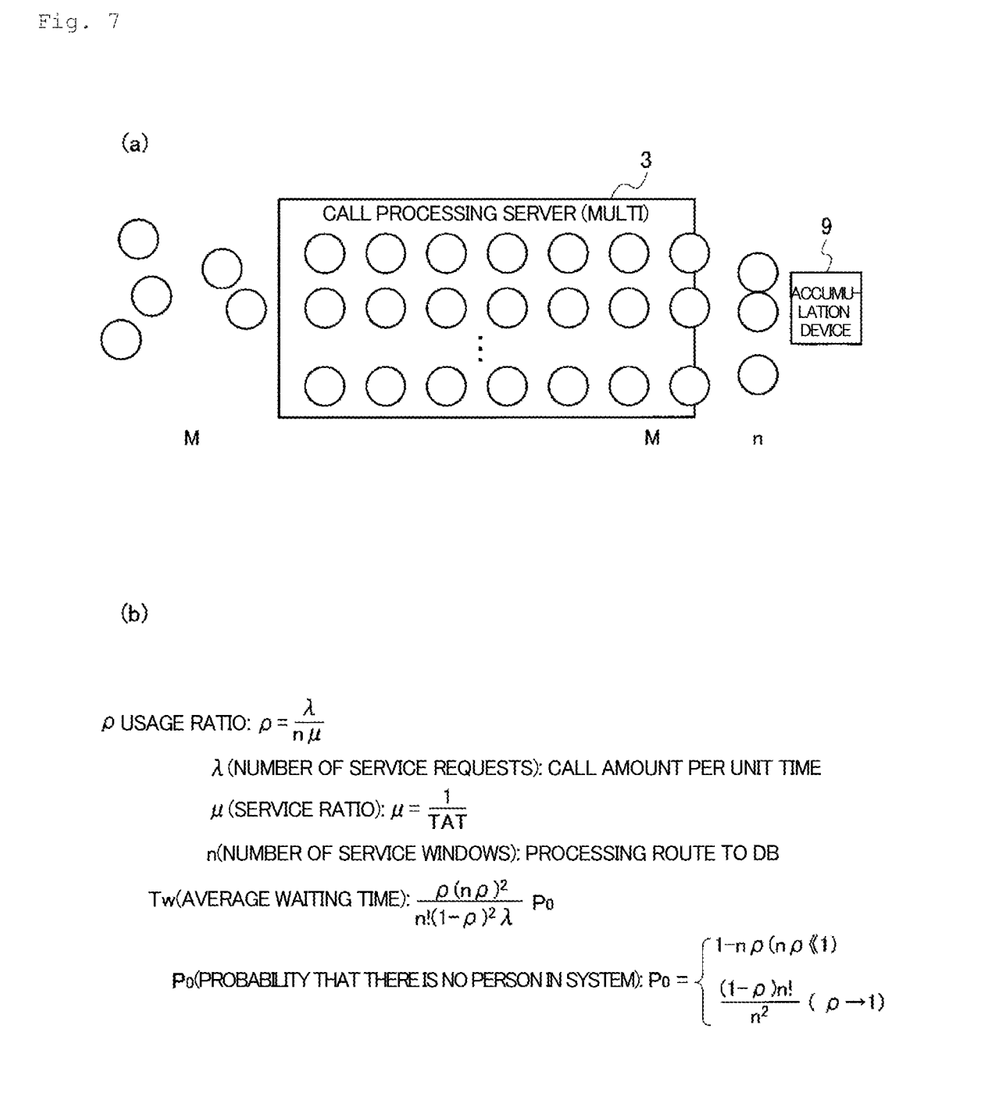
FIG. 7 is a diagram illustrating processing of calculating an average waiting time when the number of windows is plural.

Processing of calculating the average waiting time when the processing type is multi will be described with reference to FIG. 7. As illustrated in FIG. 7(a), when the processing type is multi, access to the accumulation device 4 is made by a plurality of threads in the call processing server. FIG. 7(a) illustrates a case in which the number of threads is 3. The average waiting time Tw is calculated using a usage ratio ρ, a turnaround time TAT, and the number n of service windows (the number of threads) in this case, as illustrated in FIG. 7(b). A call amount per unit time is a traffic amount of a system which is currently operating.

When the average waiting time calculating unit 21 calculates the average waiting time in accordance with the processing type of the processing section for each processing section, the calculated average waiting time is stored in the evaluation data 12.

When the maximum time of the timer set in the processing section is less than the sum of the average waiting time and the traffic amount per unit time, the evaluation unit 22 evaluates that the data used in the processing section cannot be separated to the accumulation device 4. When the maximum time of the timer set in the processing section is less than the sum of the average waiting time and the traffic amount per unit time, the call processing server 3 cannot process all the calls to be processed within the maximum time of the timer set in the processing section. Accordingly, the evaluation unit 22 outputs the evaluation indicating that the data used in this processing section cannot be separated to the accumulation device 4.

Conversely, when the maximum time of the timer set in the processing section is greater than the sum of the average waiting time and the traffic amount per unit time, the call processing server 3 can process all the calls to be processed within the maximum time of the timer set in this processing section. Accordingly, the evaluation unit 22 outputs the evaluation indicating that the data used in this processing section can be separated to the accumulation device 4.

Further, when the maximum time of the timer set in the processing section is equal to the sum of the average waiting time and the traffic amount per unit time or a difference is within a predetermined range, a possibility that the call processing server 3 cannot process all the calls to be processed within the maximum time of the timer set in this processing section is included. Accordingly, the evaluation unit 22 notifies that there is a large possibility of an influence on performance when the data used in this processing section is separated to the accumulation device 4.

The evaluation unit 22 can evaluate the influence of the performance when the data is separated to the accumulation device 4 from still another viewpoint. The evaluation unit 22 further calculates an evaluation value that increases as the average waiting time calculated for each processing section increases and increases as the maximum time of the timer set in the processing section decreases, and stores the evaluation value in the evaluation data 12. The evaluation unit 22 outputs the processing section in which the evaluation value is high as an improvement target processing section. For example, the evaluation value is calculated by adding the average waiting time calculated for each processing section and a reciprocal of the maximum time of the timer set in the processing section.

In the processing section in which the average waiting time is large and the maximum time of the timer is small, an influence involved in an increase in the traffic amount or a processing delay is considered to be large. Accordingly, the evaluation unit 22 calculates an evaluation value which is large in a processing section in which the average waiting time is large and is large in a processing section in which the maximum time of the timer is small. Thus, since a bottleneck processing section can be visualized by treating a processing section in which the evaluation value is high, efficient improvement in the system in which the data is separated to the accumulation device 4 can be expected.

Figure 8:
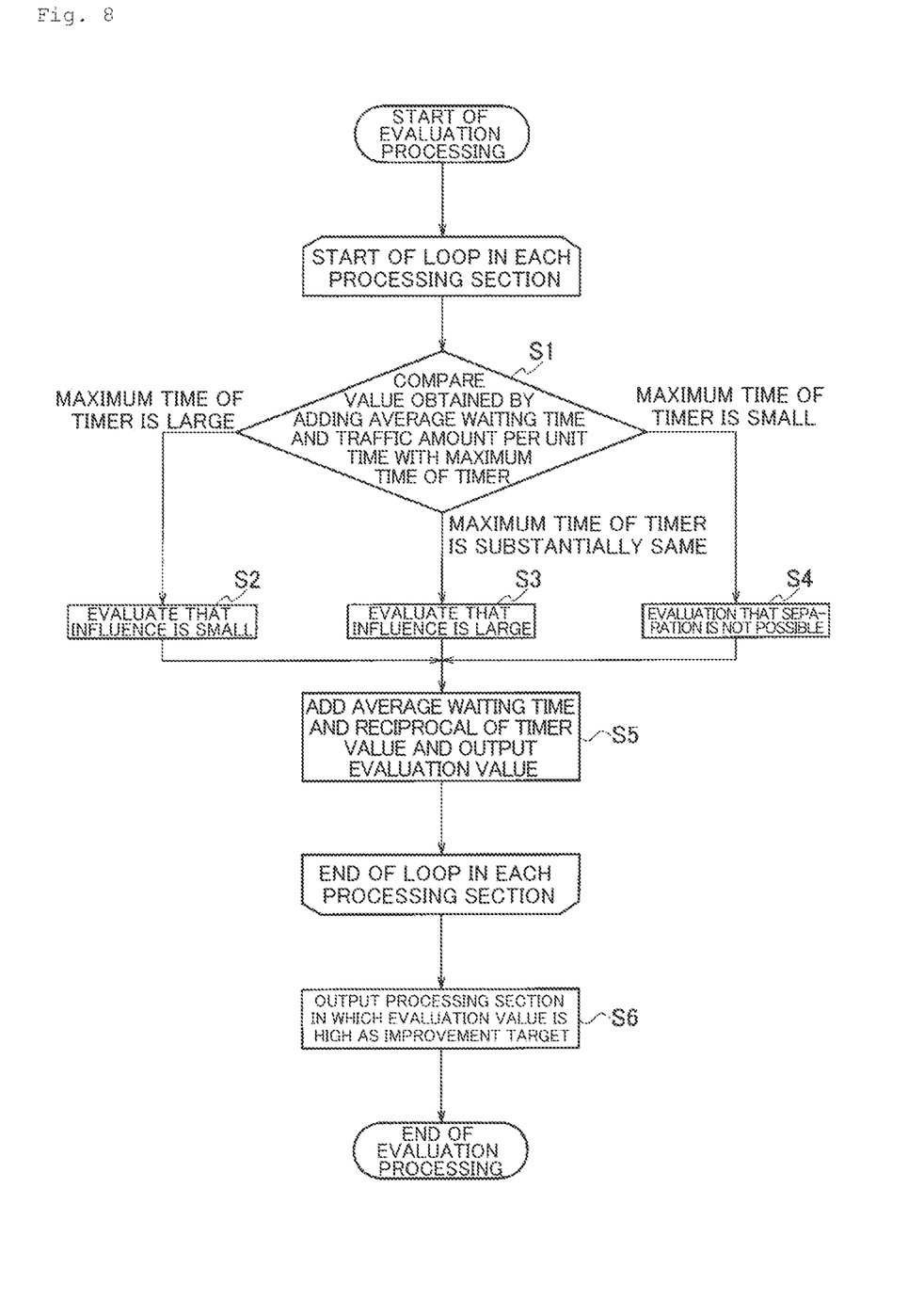
FIG. 8 is a flowchart illustrating evaluation processing by an evaluation unit according to the embodiment of the present invention.

Evaluation processing by the evaluation unit 22 will be described with reference to FIG. 8.

First, processing from step S1 to step S5 is repeated in each processing section. In step S1, the evaluation unit 22 compares a value obtained by adding the average waiting time and the traffic amount per unit time in a processing section which is a processing target with the maximum time of the timer.

When the maximum time of the timer is greater than the added value, the evaluation unit 22 evaluates in step S2 that the influence of the performance is small even when the data used in the processing section is separated to the accumulation device 4, and outputs the evaluation result.

When the maximum time of the timer is substantially the same as the sum, the evaluation unit 22 evaluates in step S3 that the influence of the performance is large when the data used in the processing section is separated to the accumulation device 4, and outputs the evaluation result.

When the maximum time of the timer is less than the sum, the evaluation unit 22 outputs the evaluation indicating that the data used in the processing section cannot be separated to the accumulation device 4 in step S4 since a delay occurs when the data used in the processing section is separated to the accumulation device 4.

When the evaluation is output in any of steps S2 to S4, the evaluation unit 22 outputs the evaluation value in the processing section which is the processing target in step S5. The evaluation value is the sum of the average waiting time of the processing section which is the processing target and a reciprocal of the maximum time of the timer.

When the processing from steps S1 to S5 ends, the evaluation unit 22 outputs the processing section in which the evaluation value is high as an improvement target in step S6. Since the average waiting time is long or the maximum time of the timer is short in the processing section in which the evaluation value is high, a processing time, a processing load, and the like of the call processing system 6 can be reduced by improving the processing section.

The evaluation device 1 according to the embodiment of the present invention can evaluate the performance after the separation of the data to the accumulation device 4 based on whether the processing can be performed within the maximum time of the timer for each processing section in which the timer is set. Thus, it is possible to encourage the separation of the data to the accumulation device 4 so that processing can be completed within a timer value set in an existing system. It is possible to avoid occurrence of processing delay or retransmission involved in the separation of the data to the accumulation device 4.

Thus, the evaluation device 1 can evaluate the influence on the performance involved in system transition in consideration of the timer set for each processing section.

Other Embodiments

An embodiment of the present invention has been described above, but it should not be understood that the present invention is limited to the text and drawings of the present disclosure. It is apparent to those skilled in the art that various substitutions, examples, and operational technologies can be embodied.

For example, the evaluation device according to the embodiment of the present invention may be configured on one piece of hardware, as illustrated in FIG. 1, or may be configured on a plurality of pieces of hardware depending on the functions or the number of steps of processing. The evaluation may be realized on an existing information processing system. The processing sequence described in the embodiment of the present invention is exemplary and the present invention is not limited thereto.

The present invention includes, of course, various embodiments which are not described herein. Accordingly, the technical scope of the present invention is determined only according to specific appropriate invention factors related to the claims from the foregoing description.

REFERENCE SIGNS LIST 1 evaluation device
3 call processing server
4 accumulation device
5 gateway server
6 call processing system
7 communication terminal
8 communication system
10 storage device
11 processing section data
12 evaluation data
20 processing device
21 average waiting time calculating unit
22 evaluation unit
30 input/output interface

The invention claimed is:

1. An evaluation device for evaluating whether to separate data used for an application to a device performing the application and an accumulation device connected via a communication network when the application is designed, the evaluation device comprising: a storage device configured to store processing section data in which a maximum time from start to expiration of a timer is associated with an identifier of a processing section in which the timer is set; an average waiting time calculating unit, including one or more processors, configured to calculate an average waiting time of a service request based on a turnaround time necessary for processing in the accumulation device for each processing section; and an evaluation unit, including one or more processors, configured to evaluate that data used in the processing section is not separable to the accumulation device when the maximum time of the timer set in the processing section is less than the sum of the average waiting time and a traffic amount per unit time.

2. The evaluation device according to claim 1, wherein the evaluation unit is configured to calculate an evaluation value which increases as the average waiting time calculated for each processing section increases and increases as the maximum time of the timer set in the processing section decreases, and output a processing section in which the evaluation value is high as an improvement target processing section.

3. The evaluation device according to claim 1, wherein, in the processing section data, a processing type indicating whether the processing is single processing connected to the accumulation device by one thread or multi-processing connected to the accumulation device by a plurality of threads is further associated with the identifier of the processing section, and wherein the average waiting time calculating unit is configured to calculate the average waiting time of the service request based on the processing type.

4. An evaluation method for evaluating whether to separate data used for an application to a device performing the application and an accumulation device connected via a communication network when the application is designed, the evaluation method comprising: causing a computer to store processing section data in which a maximum time from start to expiration of a timer is associated with an identifier of a processing section in which the timer is set; causing the computer to calculate an average waiting time of a service request based on a turnaround time necessary for processing in the accumulation device for each processing section; and causing the computer to evaluate that data used in the processing section is not separable to the accumulation device when the maximum time of the timer set in the processing section is less than the sum of the average waiting time and a traffic amount per unit time.

5. The evaluation method according to claim 4, wherein, in evaluating the data, an evaluation value which increases as the average waiting time calculated for each processing section increases and increases as the maximum time of the timer set in the processing section decreases is calculated, and a processing section in which the evaluation value is high is output as an improvement target processing section.

6. The evaluation method according to claim 4, wherein, in the processing section data, a processing type indicating whether the processing is single processing connected to the accumulation device by one thread or multi-processing connected to the accumulation device by a plurality of threads is further associated with the identifier of the processing section, and wherein, in calculating the average waiting time, the average waiting time of the service request is calculated based on the processing type.

7. A non-transitory computer readable medium storing an evaluation program for causing a computer to function as the evaluation device for evaluating whether to separate data used for an application to a device performing the application and an accumulation device connected via a communication network when the application is designed, the evaluation device comprising:
a storage device configured to store processing section data in which a maximum time from start to expiration of a timer is associated with an identifier of a processing section in which the timer is set;
an average waiting time calculating unit configured to calculate an average waiting time of a service request based on a turnaround time necessary for processing in the accumulation device for each processing section; and
an evaluation unit configured to evaluate that data used in the processing section is not separable to the accumulation device when the maximum time of the timer set in the processing section is less than the sum of the average waiting time and a traffic amount per unit time.

8. The non-transitory computer readable medium according to claim 7, wherein the evaluation unit is configured to calculate an evaluation value which increases as the average waiting time calculated for each processing section increases and increases as the maximum time of the timer set in the processing section decreases, and output a processing section in which the evaluation value is high as an improvement target processing section.

9. The non-transitory computer readable medium according to claim 7, wherein:
in the processing section data, a processing type indicating whether the processing is single processing connected to the accumulation device by one thread or multi-processing connected to the accumulation device by a plurality of threads is further associated with the identifier of the processing section; and
the average waiting time calculating unit is configured to calculate the average waiting time of the service request based on the processing type.

* * * * *